Feb. 18, 1947.    W. W. SLOANE    2,415,915
FLUID-OPERATED CONTROL SYSTEM
Original Filed Aug. 28, 1942    3 Sheets-Sheet 1

INVENTOR
William W. Sloane
Clarence F. Poole
ATTORNEY

Feb. 18, 1947.  W. W. SLOANE  2,415,915
FLUID-OPERATED CONTROL SYSTEM
Original Filed Aug. 28, 1942   3 Sheets-Sheet 2
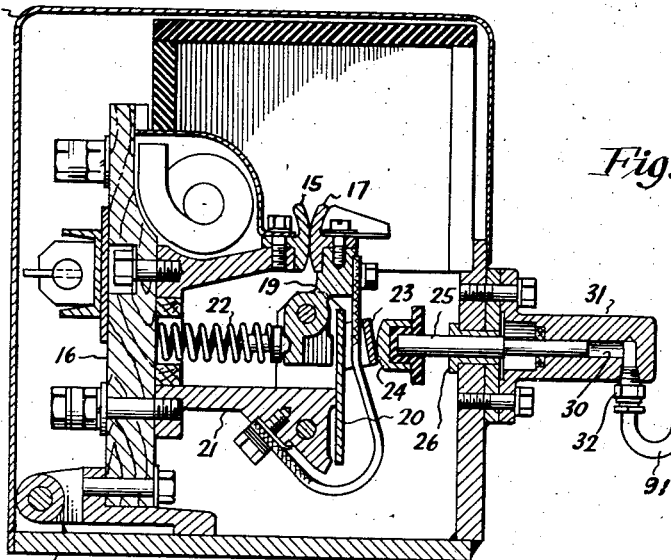
Fig. 2
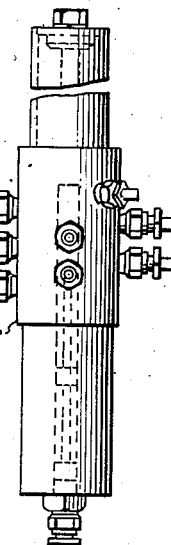
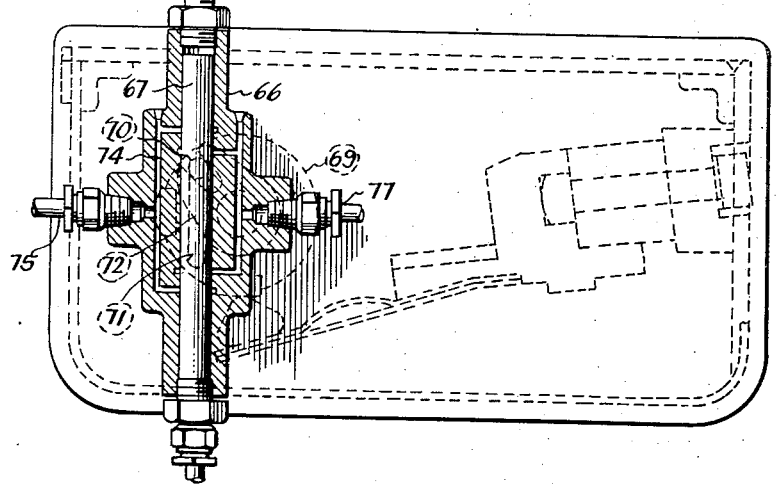
Fig. 3
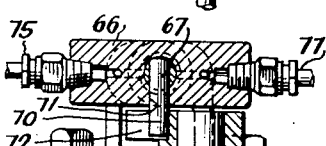
Fig. 4
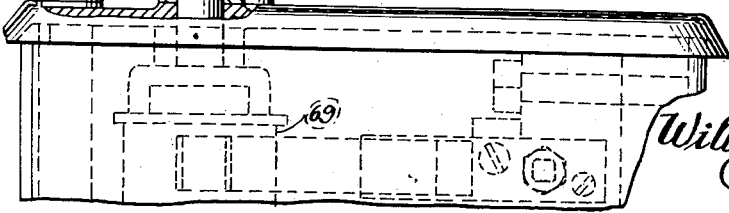
INVENTOR
William W. Sloane
Clarence F. Bolt
ATTORNEY

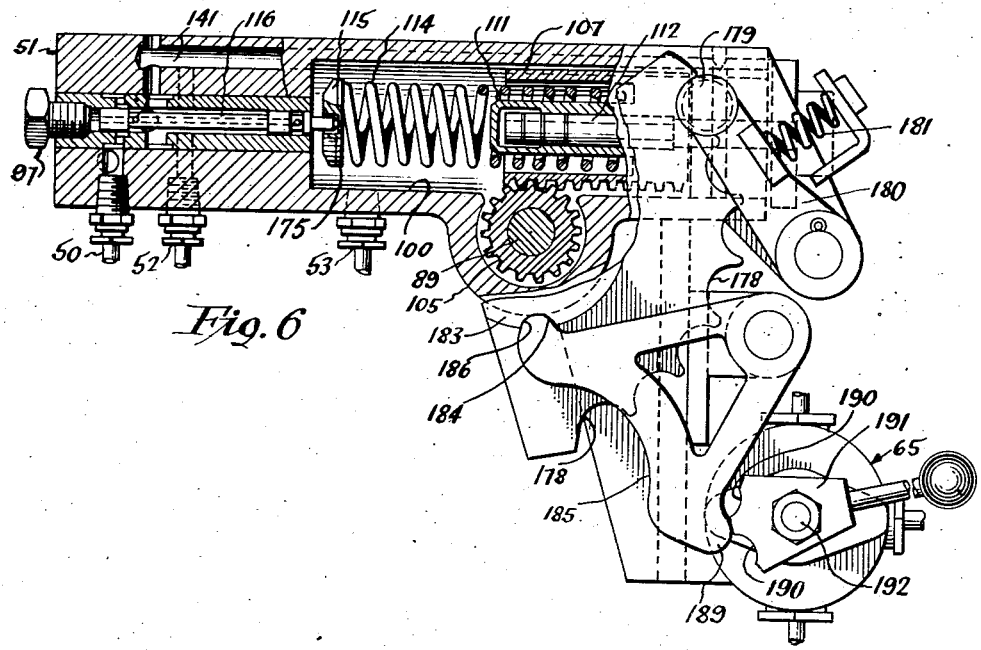
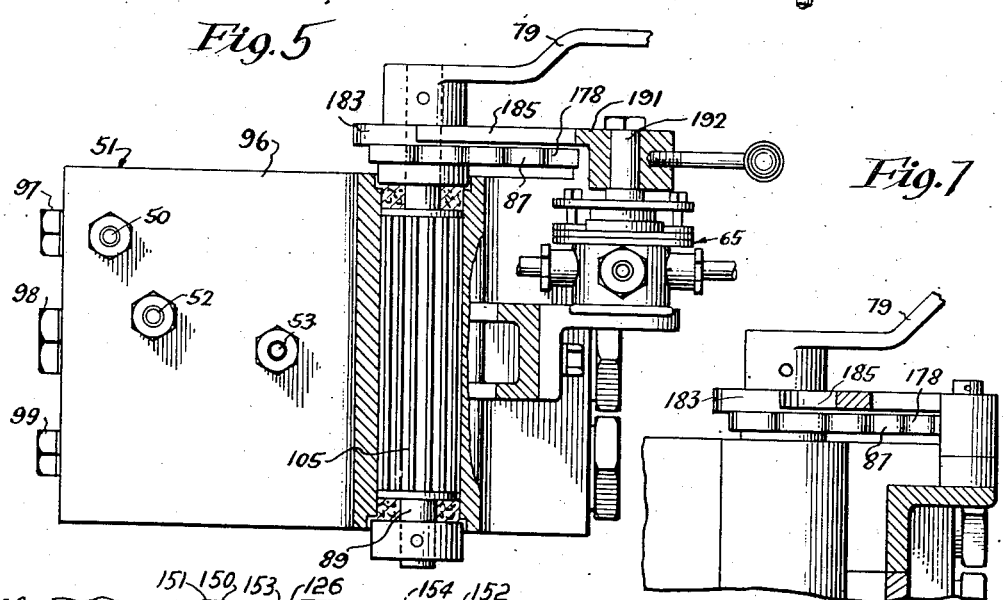
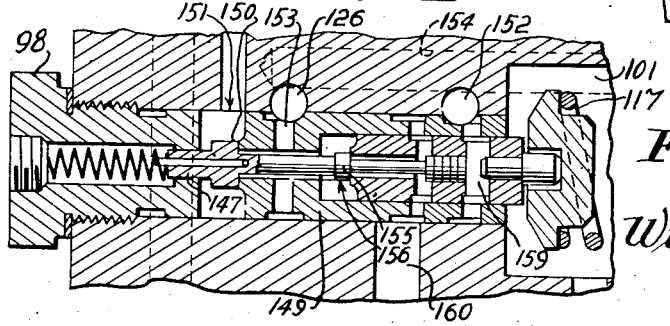

Patented Feb. 18, 1947

2,415,915

UNITED STATES PATENT OFFICE 2,415,915

FLUID-OPERATED CONTROL SYSTEM

William W. Sloane, Chicago, Ill., assignor to Goodman Manufacturing Company, Chicago, Ill., a corporation of Illinois Original application August 28, 1942, Serial No. 456,490, now Patent No. 2,383,894, dated August 28, 1945. Divided and this application May 22, 1943, Serial No. 488,015

2 Claims. (Cl. 60—97)

This invention relates to a fluid-operated control system particularly adapted to control the electric circuits of electric motors used to propel mine locomotives, but not necessarily limited to such use.

The principal objects of the invention are to provide a novel and compact form of control system for an electrical circuit particularly adapted to control the operation of a mine locomotive in a more positive and efficient manner than formerly, which does away with all electrical connections in the operator's cab, so as to increase the safety of the locomotive and save space in said cab.

A further object of my invention is to provide a new and improved controller wherein the electrical connections are at a distance from the operator, close to the devices they control, and wherein fluid pressure means located outside of the casing of the controller proper are provided to operate the electric contacts.

A more specific object of my invention is to provide a fluid-operated controller particularly adapted for starting the motor of a mine locomotive and controlling operation thereof, and including a novel form of distributor valve for supplying fluid at pressures increasing or decreasing step by step, to successively close or open the electrical contacts controlling the electrical circuit of the locomotive, together with a novel form of control valve for controlling operation of said distributor valve by supplying fluid under pressure thereto at pressures positively increasing step by step by predetermined values, and decreasing in the same manner.

This application is a division of application Serial No. 456,490, filed August 28, 1942, and entitled Fluid-operated control systems, now Patent No. 2,383,894, dated August 28, 1945.

Other objects and novel features of my invention will appear from time to time as the following specification proceeds and with reference to the accompanying drawings wherein:

Figure 2 is a transverse sectional view taken through a controller constructed in accordance with my invention and showing a distributor valve connected thereto, for supplying fluid under pressure thereto;

Figure 3 is a top plan view of a casing for a reverse drum, with a fluid motor for operating the reverse drum shown in horizontal section;

Figure 4 is a fragmentary view in side elevation of the control casing, showing the valve for operating the reverse drum in transverse section;

Figure 5 is a view in side elevation of the control valve, for supplying fluid to the distributor valve under different pressures, with parts of the valve shown in section;

Figure 6 is a top plan view of the valve shown in Figure 5, with certain parts of the valve shown in horizontal section;

Figure 1:
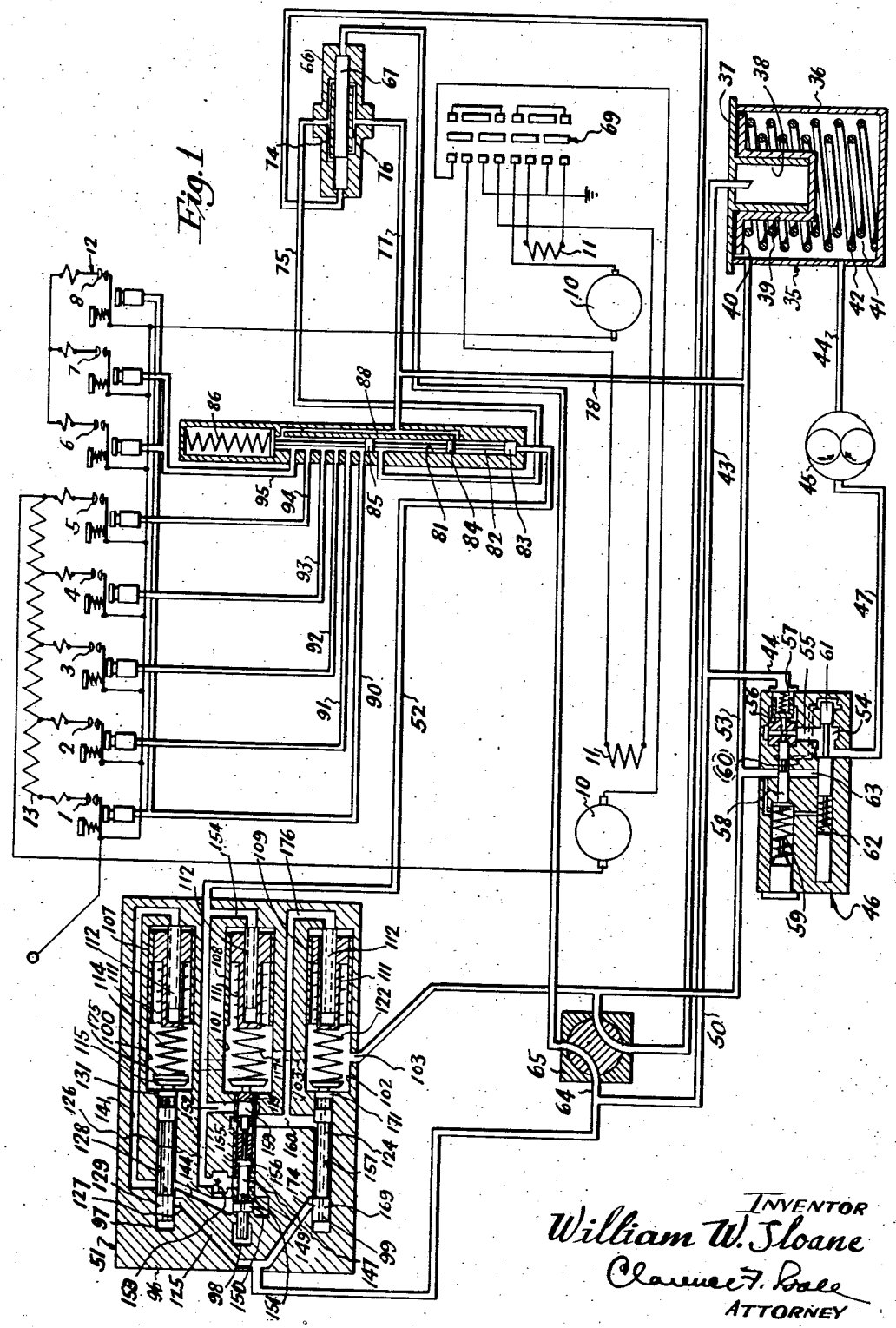
Figure 1 is a diagrammatic view illustrating an electrical control circuit for two motors of an electrical device such as a locomotive, and showing the fluid circuit for controlling operation thereof.

Figure 7 is a fragmentary detail view in side elevation of the valve shown in Figure 5, with certain parts shown in section, and illustrating more clearly certain details of the interlocking connection between the valve which controls reversal of the control circuit; and Figure 8 is an enlarged detail partial fragmentary longitudinal sectional view of the intermediate pressure control valve of the control valve illustrated in Figures 1, 5 and 6.

In Figure 1 of the drawings an electrical control circuit is shown which is particularly adapted to control the simultaneous operation of a plurality of motors, preferably the motors of a mine locomotive, and a hydraulic control system arranged in accordance with my invention, is shown for controlling operation of the electrical contacts of this control circuit. The motors are herein shown as being connected in parallel for simplicity, it being understood that the electrical control circuit may be so arranged as to connect them in series or in series parallel, or in any other desired manner. Said motors each consist of an armature 10 and a field 11, and starting and stopping thereof is controlled by an electrical controller generally indicated by reference character 12. Said controller includes a plurality of fluid-operated contactors 1, 2, 3, 4, 5, 6, 7 and 8, for connecting the motors in the power line and for progressively cutting sections of a resistance 13 from the motor circuit.

The controller 12, as illustrated in Figure 2, includes a casing 14 forming an enclosure for the contactors 1 to 8 inclusive. Said contactors are each of the same construction so contactor 1 only will herein be shown and described in detail. Said contactor includes a stationary contact 15 mounted on an insulating board 16, and a movable contact 17 engageable with said stationary contact. Said movable contact is mounted on a pivoted arm 19, which is pivoted intermediate its ends to a swinging arm 20, transversely pivoted to a stationary support bracket 21. A coil spring 22 is interposed between the insulating board 16 and the free end of the arm 19 and is adapted to move the contact 17 to an open position with a wiping action. The swinging arm 20 is provided with an engaging abutment 23 projecting outwardly therefrom, which is engaged with an engaging member 24 on the end of a plunger 25. Said plunger is slidably mounted in a bearing 26, carried in an end wall of the casing 14, and extends outwardly from said casing into a fluid chamber 30, formed in a cylinder 31 secured to the outside of said casing. A fitting 32 connects said fluid chamber with a distributor valve 33 through a pipe 91. Suitable packing is provided to prevent fluid from entering said casing. Thus when fluid is admitted to the chamber 30, the plunger 25 is moved in a direction to engage the contact 15 with the contact 17, the spring 22 serving to disengage said contacts, when pressure is released from said chamber. The fluid operating mechanism for the contactor is entirely outside of the contactor casing, so that no fluid will enter said casing. A leakage drain (not shown) may be provided to permit fluid which may leak past said plunger to return to the fluid storage tank.

Referring now in particular to the fluid diagram illustrated in Figure 1, a fluid pump 45 is provided to effect pressure in the system. Said pump is connected with an accumulator 35 by means of a pipe line 44, which accumulator serves as a fluid storage tank for the hydraulic system. Said accumulator may be of any well known form and, as herein shown, includes a cylindrical tank 36 having a cover 37. Said cover is provided with an inwardly extending cylindrical portion 38, extending within and opening into said tank. A cylindrical piston 39 is mounted on said cylindrical portion 38, for slidable movement with respect thereto. Said piston has a closed inner end and a flanged portion 40, adapted to abut the inside of said cover 37, when said piston is in a retracted position. A pair of concentrically arranged compression springs 41 and 42 are interposed between the bottom of said tank and the inside of said flange 40 of said piston, to urge said piston into a retracted position.

A high pressure pipe line 43 connects the inwardly extending cylindrical portion 38 of said accumulator with the pump 45 through a relief valve 46, so that pressure in the fluid system will supply pressure to said cylinder 38 and cylindrical piston 39 and move said piston against the compression springs 41 and 42, to compress said springs. The strength of said springs is such that fluid under pressure accumulated in said cylinder and piston, will be supplied to the system through said springs, whenever said fluid pump stops.

The pump 45, which supplies fluid under pressure to said accumulator and to the hydraulic system, is herein shown as being a well known form of gear pump and is connected with the relief valve 46 by means of a pipe line 47. Said relief valve has connection with the pipe line 43, leading to the pressure side of the accumulator, by means of the pipe line 44, which is also connected to a pressure pipe line 50, leading to a control valve 51, which serves to supply fluid to the distributor valve 33 at progressively increasing or decreasing pressures, through a control pipe line 52. A low pressure pipe line 53 leads from said relief valve to the cylindrical tank 36 of the accumulator 35.

The relief valve 46 is so arranged that under normal pressures fluid will pass from the pipe line 47 through a chamber 54 of said valve, through a passageway 55, and chamber 56, to and through a check valve 57 to the pipe line 44. Upon overload, fluid under pressure in the chamber 56 will move a piston 58 in said chamber 56 against a spring 59, to a position to open a port to a passageway 60, to permit fluid under pressure to engage the under side of a piston 61 in the chamber 54. This will move said piston against a spring 62 and open a port leading to a passageway 63, to bypass fluid through said passageway to the tank 36 of accumulator 35, through the pipe 53. Upon the release of pressure, the spring 59 will move the piston 58 in a direction to close the passageway 60 to fluid under pressure and open said passageway to the return line 53. At this time pressure will be relieved from the piston 61, and the spring 62 will move said piston in a direction to close the passageway 63.

A pipe line 64 leads from the pipe line 50 to a 4-way valve 65, which serves as a reversing valve, for reversing the direction of the flow of fluid to a reversing cylinder 66. Said cylinder is provided to operate a reverse drum 69 for the motors of the locomotive and has a piston 67 movable therein, which is connected with said reverse drum by means of a depending pin 70 (see Figures 3 and 4). Said reversing cylinder 66 is shown as being mounted on the outside of a casing 68 for said reverse drum and the contacts therefor. The pin 70 depends from said piston, intermediate the ends thereof, and extends through a slot 71 in the lower portion of said cylinder and has engagement at its lower end with a slotted lever arm 72, secured to the upper end of a shaft 73, upon which said reverse drum is mounted. Rectilinear movement of said piston in one direction or another will thus turn said reverse drum 69 to a forward or reverse position in an obvious manner.

The body of the reversing cylinder 66 is provided with a longitudinally extending pressure passageway 74 opening into said cylinder at longitudinally spaced points, which are spaced equally from the transverse center of said cylinder so that one or the other openings to said passageway will be uncovered by said piston when said piston is in one extreme position or another. Said passageway is connected with the distributor pipe 75, which is connected with the distributor valve 33, for supplying fluid under pressure to the fluid-operating mechanism for the contactors 1 to 8 inclusive, in a manner which will hereinafter more clearly appear as this specification proceeds.

Since the passageway 74 is only open to the cylinder 66, when the piston 67 is in one extreme position or another and the reverse drum is in either a forward or reverse position, fluid under pressure can only flow from reversing cylinder 66 to the distributor valve 33, when said reverse drum is in one of these positions. Thus, a hydraulic interlock is provided between said distributor valve and reverse drum, to prevent operation of said distributor valve, until said reverse drum is in the proper operating position.

Another passageway 76 is provided in the cylinder 66 to take care of any leakage between the piston 67 and the walls of said cylinder. A pipe 77 leads from said passageway to a pipe 78, which connects with the drain pipe 53, leading to the storage tank 36 of the accumulator 35.

The distributor valve 33 is provided with a cylindrical chamber 81, having a piston 82 movable therein. Said piston has three spaced apart lands 83, 84 and 85, the land 83 being at the end of said piston adjacent the inlet from the control pipe 52, so that fluid under pressure, entering said valve from said pipe, will move said piston against a coil spring 86, interposed between the inner end of said chamber and the end of said piston opposite from the land 83.

A drain passageway 88 is provided in the body of the distributor valve 33 and leads from a position between the lands 83 and 84 to a position above the land 85, when the piston 82 is in an extreme on position, to take care of any leakage of fluid past said lands 83, 84 and 85. Said drain passageway is connected with the pipe 78, which leads to the tank 36 of accumulator 35.

The pressure pipe 75 enters the distributor valve 33, intermediate the ends thereof at a point disposed adjacent the lower end of the land 85, when the piston 82 is at an extreme off position and the spring 86 is extended, as in Figure 1. The lands 84 and 85 are so spaced that fluid under pressure will be supplied in the space between said lands by said pressure pipe, in all positions of said piston in said cylindrical chamber 81. It should be noted that fluid admitted from the pipe 75 acts equally in opposite directions on the piston 82, so has no tendency to move said piston in the direction of its axis.

Pipes 90, 91, 92, 93, 94 and 95 lead from ports in the chamber 81, which are disposed on the opposite side of the land 85 from the lands 83 and 84, when the piston 82 is in an off position. Said pipes are so arranged that the respective passageways connecting said pipes to the chamber 81 will be successively uncovered by the land 85, to admit fluid under pressure from the pipe 75 thereto, upon movement of the piston 82 against the spring 86. Thus, as the piston 82 moves to successively uncover the passageways 90 to 95 inclusive, the contactors associated therewith will be closed in the hereinbefore described manner, to connect the motors of the locomotive in the main line circuit, and to cut out the resistance 13 from the motor circuit, step by step, under control of the operator.

The strength of the spring 86 is such that the piston 82 will move to uncover the passageway leading from the pipe 90 when fluid enters the chamber 81 from the pipe 52 at a predetermined pressure, and will uncover the next passageway when the fluid pressure increases a predetermined amount, and so on until all of the passageways are uncovered step by step.

The control valve 51. provided to supply fluid under pressure to the distributor valve 33 at uniformly increasing or decreasing pressures, which change step by step for each port opening of said distributor valve, as a control handle 79 of said valve is turned by the operator in one direction or another, is in the form of a triple valve including a block 96 having three valve elements 97, 98 and 99 therein controlled in unison by the control handle 79. Said valve is clearly shown and described in Patent No. 2,383,894, of which this is a division, so will only herein be shown and described in so far as is necessary to make my present invention clearly understandable.

The valve element 97 is of the piston type and serves as a charging valve for controlling the admission of fluid under pressure to the pressure side of the valve element 98, which is of the poppet type. The valve 98 includes separate pressure and release valves 151 and 156 of the poppet type, which are adapted to open practically simultaneously on the slightest movement of their control means, so that said valve element 98 serves as a pressure adjusting valve when used in conjunction with the valve elements 97 and 99, to adjust the pressure in the control line 52 at the proper pressure at the same positions of the control handle, with little or no error when the triple valve mechanism is turned in an on or an off direction. The valve element 99 is similar to the valve element 97 and serves as a discharge valve to release fluid discharged through the valve element 98 to the return. This last mentioned valve element and the valve element 97 also serve to maintain a predetermined pressure difference on opposite sides of the poppet valve element 98, to reduce any pressure inaccuracies which might be caused by an unbalanced pressure on the valve seat areas of said poppet valves 151 and 156.

The valve elements 97, 98 and 99 communicate with three aligned cylindrical chambers 100, 101 and 102 formed in the block 96 of the valve element 51. Said chambers are each connected with the low pressure side of the accumulator 35 by means of passageways 103, 103 connected to the return line 53. Said chambers besides forming return passageways for the fluid also form enclosures for the control means for said respective valve elements 97, 98 and 99.

Operation of the valve elements 97, 98 and 99 is controlled by means of a gear 105, on a shaft 89, which has the control handle 79 mounted on its upper end (see Figures 5 and 6). The teeth of said gear have elongated faces and mesh with teeth formed in cylindrical valve operating sleeves 107, 108 and 109, which are slidably mounted within the chambers 100, 101 and 102 respectively. Said valve operating sleeves are each mounted on a flanged portion of a hollow supporting member 111, which is closed at its inner end, and which extends within each sleeve (see Figure 6). Each of said hollow supporting members is slidably mounted on a pilot 112, which is bored to admit fluid therethrough to the inside of its associated supporting member, to exert a pressure on said supporting member in a direction to move said member along said pilot.

A compression spring 114 extends within the valve operating member 107 of valve element 97 and is seated at one of its ends in the flanged portion of the member 111. The opposite end of said spring abuts a washer 175 on a seat 115, freely mounted on the inner or right-hand end of a piston valve 116 for the valve element 97. The connection between said seat and piston valve is loose, to avoid binding between said seat and valve and to cause an even pressure to be exerted on said valve by said spring.

In a like manner, a compression spring 117, in the chamber 101, extends within the valve operating sleeve 108 of valve element 98 and is provided to open said valve upon compression of said spring by turning movement of the control handle 79.

The valve operating sleeve 109 of valve element 99 also has a compression spring 122 seated therein, for operating a piston valve 124 of said valve element.

Fluid under pressure from the accumulator 35 enters the charging valve element 97 through a passageway 125, connected with the pressure pipe 59. This passageway is connected with said valve element by a port 127 in a valve cylinder 128 for said valve element. Said passageway is connected with the discharge valve element 99 by a port 174 in a valve cylinder 157 of said valve element. A passageway 144 connects said valve element 97 with the pressure side of the adjusting valve element 98, and a passageway 160 on the discharge side of said pressure adjusting valve element connects said pressure adjusting valve with the discharge valve element 99.

The piston valve 116 of the charging valve element 97 has a land or piston 129 at the left-hand end thereof which laps the port 127 and which serves to control opening or closing thereof. Said piston valve is drilled longitudinally and is cross drilled to permit fluid to pass therethrough and balance said valve, and also to permit the discharge of fluid through the chamber 101 and passageways 103, 103, when a land or piston 131 of said valve, adjacent the chamber 100, is open to said chamber. When said piston valve is moved to the left through the spring 114, fluid under pressure will enter the valve cylinder 128 and a passageway 141 which leads to the pilot 112 for the valve operating sleeve 107, to balance the pressure of the spring 114 against said valve operating sleeve and the control handle 79. Fluid will also flow through a passageway 144 to the pressure adjusting valve 98.

A piston valve 124 of the discharge valve element 99 is slidably mounted in a valve cylinder 157. Said piston valve is provided with a land 169 at the left-hand end thereof, adapted to control the passage of fluid into said valve cylinder through the port 174, and is provided with a land 171 at the opposite end thereof, adapted to control the discharge of fluid to the return through the chamber 102. Said piston valve is drilled longitudinally and is cross drilled to permit fluid to pass therethrough and balance said valve, and also to permit the discharge of fluid through the chamber 102 when the land 171 is open to said chamber.

When the valve 169 of the valve element 99 is open, fluid will flow through the valve cylinder 157 in the space between the lands of the piston valve 124 through the passageway 160 and a passageway 176 to and through the pilot 112 of the valve operating member 108, to balance the pressure the spring 122 exerts against said piston valve. Fluid will also flow to the discharge side of the pressure adjusting valve element 98, to exert a back pressure on said pressure adjusting valve and overcome the unbalanced pressure on the valve seat of said valve.

The pressure adjusting valve element 98 includes the poppet valve 151 which controls the admission of fluid to the control line 52, and the poppet valve 156 which controls the discharge of fluid from said control line. Said pressure adjusting valve also includes a plunger 147 slidably mounted in a valve cylinder 149. The left-hand end of said valve cylinder is shaped to form a seat which is adapted to be engaged by the right-hand end of an enlarged portion 150 of said plunger 147, to form the poppet valve 151 which will open or close upon a very slight movement of said plunger. Said poppet valve is adapted to open or close a passageway through said valve cylinder 149, leading to a passageway 153 in said cylinder, which communicates with a passageway 126 and the control line 52, for supplying fluid under pressure to the distributor valve 33. A passageway 154 leads from the passageway 126 to and through the pilot for the valve operating sleeve 108 and to the hollow member 111 for said valve operating sleeve, for balancing the spring pressure against said valve operating sleeve and the control handle 79.

The right-hand portion of the valve cylinder 149 has a hollow piston 119 slidably mounted therein. Said hollow piston has the right-hand end of the plunger 147 slidably mounted therein. The left-hand end of said hollow piston is shaped to form a seat for the right-hand end of an enlarged valve portion 155 of said plunger 147, to form a poppet valve 156 which controls the flow of fluid through the discharge passageway 160, to the discharge valve element 99.

Displacement of the spring 114 toward the valve cylinder 149 will move the hollow piston 119 and plunger 147 in a direction to open the poppet valve 151, to admit fluid under pressure to the pressure line 153. Fluid pressure exerted on said hollow piston to the right, against the compression spring 117, will tend to move said hollow piston to the right to open the valve 156 and permit the discharge of fluid through the passageway 160.

The plunger 147 is longitudinally drilled from the left-hand end thereof and is cross drilled just to the right of the valve 151, to admit fluid under pressure to the right-hand end of said plunger. Pressure is exerted on the right-hand end of said plunger, to balance said plunger except for the unbalanced pressures in the annular spaces under the valves 151 and 156, through a passageway 159 in the hollow piston 119.

When the control handle 79 is turned from an off position to the first on position, fluid from the accumulator 35 will be admitted by the piston 129 through the port 127 and through the passageway 144, to build up pressure in said passageway until the poppet valve 151 is opened by its spring 117, to admit fluid under a predetermined pressure to the passageway 126 and the pressure line 52, to the head end of the piston 82 of the distributor valve 33. When said control handle is on the first on position, fluid will be supplied to said distributor valve at a pressure sufficient to open the port leading to the pipe 90 and permit fluid from the pressure line 75 to pass through said pipe and close the first contactor.

As the control handle 79 is turned to the next on position, the tension of the springs 114, 117 and 119 will be increased a predetermined amount. This will increase the pressure required to close the port 127 and will thus cause a predetermined increase in pressure in the passageway 126 and pressure line 52, to move the piston 82 against the spring 86 a distance sufficient to open the next port, which leads to the pipe 91, to admit pressure to said pipe and close the second contactor. This operation is continued until all of the ports leading to the passageways 93, 94, and 95 have been opened and the locomotive is in the fully on position.

When turning the control handle in an opposite direction, fluid pressure against the piston 83 will be progressively decreased step by step, to permit the spring 86 to move the piston 82 in a direction to progressively close the ports leading from the passageways 95, 94, 93, 92, 91 and 90, respectively, until the controller is in a fully off position.

A notching cam 87 on shaft 89 for the control handle 79 is provided with a plurality of spaced notches 178, 178 formed in the periphery thereof, which designate the various positions at which definite step by step pressures are established and maintained in the control line 52, so that the distributor valve 33 will have a full opening of the corresponding port. The various positions of said control handle are indexed by means of a roller 179 on the end of a rocking arm 180, which is yieldably pressed into engagement with said notches 178 by means of a spring 181, engaging said rocking arm.

An interlocking connection is provided between the control valve 51 and the 4-way reversing valve 65, to prevent operation of said reversing valve except when said control valve is in an off position, and to prevent operation of said control valve except when said reverse valve is in a forward or a reverse position. Said interlocking connection, as herein shown, includes a disk 183 secured to the shaft 89, just above the notching cam 87, and adapted to be engaged by an engaging end 184 of a rocking arm 185. Said disk is provided with a notch 186 on the face thereof, which corresponds with the off position of said control valve, and which is adapted to be engaged by said projecting engaging end. Said rocking arm is provided with an engaging end 189, spaced from and extending in an opposite direction from the engaging end 184, which is adapted to register for engagement with either one of a pair of notches 190, 190 on a locking plate 191, which is secured to a shaft 192 for said reverse valve 65.

When the control valve 51 is in an off position, the projecting end 184 of the rocking arm 185 may engage the notches 186, 186 of the disk 183. When said end of said rocking arm is in engagement with said recessed portion of said disk, the locking plate 191 and valve shaft 192 will be free to pivot. When the reversing valve is in an intermediate position, between an extreme forward or reverse position, the engaging end 189 of the arm 185 will engage the high spot between the notches 190, 190 and the engaging end 184 will be held in engagement with the recessed portion 186, to lock the control handle 79 against turning until the locking plate 191 is in a position to permit the engaging end 189 to drop into either one of the notches 190, 190, at which time said reverse drum will be in either a forward or reverse position. When said engaging end 184 is moved out of engagement of said notch 186, said engaging end 189, engaging either of said notches 190, 190, will be held in engagement with either of said notches by said engaging end 189 and star wheel, to lock said reversing valve from turning movement until said control handle 79 has been moved to turn the control valve 51 to an extreme off position, so said engaging end 184 may drop into the notch 186.

While I have herein shown and described one form in which my invention may be embodied, it will be understood that the construction thereof and the arrangement of the various parts may be altered without departing from the spirit and scope thereof. Furthermore, I do not wish to be construed as limiting my invention to the specific embodiment illustrated, excepting as it may be limited in the appended claims.

I claim as my invention:

1. In a fluid-operated controller, for controlling an electrical circuit or the like, a plurality of devices to be actuated, a plurality of fluid pressure means for actuating said devices in a predetermined order, a distributor valve for supplying fluid under pressure to said fluid pressure means in said predetermined order, another device to be actuated, a fluid cylinder, a double-acting piston within said cylinder, an operative connection from said piston to said other device for moving the latter to either one of two predetermined positions, fluid connections to opposite ends of said cylinder, a reverse valve for controlling the admission of fluid to either end of said cylinder, to move said piston therein in one direction or another, a passageway leading from two spaced apart openings along said cylinder to said distributor valve for supplying fluid under pressure thereto and to said fluid means through said distributor valve, said piston being adapted to close each of said openings to said passageway, except when in a position to move said other device to one of its predetermined positions, and when in either such position, to open the corresponding opening to fluid from the end of said cylinder with which said opening is associated, to prevent operation of said first named devices except when said second device is in either one of its predetermined positions, a control valve for supplying fluid under pressure to said distributor valve at pressures increasing or decreasing step by step to progressively actuate said distributor valve and thereby actuate said plurality of devices, and a mechanical interlocking connection between said control valve and said reverse valve, to prevent operation of said reverse valve except when said control valve is in an off position.

2. In a fluid-operated controller for controlling an electrical circuit or the like, a plurality of devices to be actuated, a plurality of fluid pressure means for actuating said devices in a predetermined order, a distributor valve for supplying fluid under pressure to said fluid pressure means in said predetermined order, another device to be actuated, a fluid cylinder, a piston within said cylinder, an operative connection between said piston and said other device for moving the latter to either one of two predetermined positions, fluid connections to said cylinder, a reverse valve for controlling the admission of fluid to said cylinder through said fluid connections, a passageway leading from two spaced apart openings along said cylinder to said distributor valve for supplying fluid under pressure thereto and for supplying fluid under pressure to said fluid means through said distributor valve, said piston being adapted to close each of said openings to said passageway, except when in a position to move said other device to one of its said predetermined positions, and when in either of such positions to open the corresponding opening to fluid from the end of said cylinder with which said opening is associated, to prevent operation of said first named devices except when said second device is in either one of its predetermined positions, a control valve for supplying fluid under pressure to said distributor valve to actuate said distributor valve and thereby actuate said plurality of devices, and a mechanical interlocking connection between said control valve and said reverse valve, to prevent operation of said reverse valve except when said control valve is in an off position.

WILLIAM W. SLOANE.

REFERENCES CITED

The following references are of record in the file of this patent:

UNITED STATES PATENTS

| Number | Name | Date |
|---|---|---|
| 684,609 | Hill | Oct. 15, 1901 |
| 1,005,420 | Darlington | Oct. 10, 1911 |
| 2,102,294 | Taliaferro et al. | Dec. 14, 1937 |
| 2,326,911 | Aikman | Aug. 17, 1943 |
| 2,259,763 | Naylor | Oct. 21, 1941 |
| 1,199,640 | Vincent | Sept. 26, 1916 |
| 2,273,171 | Bennett | Feb. 17, 1942 |
| 2,185,449 | Veenschoten | Jan. 2, 1940 |

FOREIGN PATENTS

| Number | Country | Date |
|---|---|---|
| 765,354 | French (Baudet) | 1934 |
| 842,641 | French (Vincelli) | 1939 |